RECORD CHANGER SPINDLE

Filed April 22, 1965

Inventors
Michael H. Estkowski and
James L. D. Morrison
By Brown, Jackson,
Boettcher and Dienner Att'ys

RECORD CHANGER SPINDLE

Filed April 22, 1965 3 Sheets-Sheet 2

Inventors
Michael H. Estkowski
and James L. D. Morrison
By Brown, Jackson,
Boettcher and Dienner Att'ys.

RECORD CHANGER SPINDLE

Filed April 22, 1965 3 Sheets-Sheet 3

Inventors
Michael H. Estkowski
and James L. D. Morrison
By Brown, Jackson,
Boettcher and Dienner Att'ys.

United States Patent Office 3,376,043
Patented Apr. 2, 1968

3,376,043
RECORD CHANGER SPINDLE

Michael H. Estkowski, St. Joseph, Mich., and James L. D. Morrison, Los Angeles, Calif.; said Estkowski, assignor to V-M Corporation, Benton Harbor, Mich., a corporation of Michigan Filed Apr. 22, 1965, Ser. No. 449,996
6 Claims. (Cl. 274—10)

ABSTRACT OF THE DISCLOSURE

A record changer spindle having primary record supporting fingers which normally support a stack of records on the spindle and are withdrawn to release the lowermost record in the stack to a turntable for playing. The spindle has a secondary record supporting arrangement which supports the remaining stack of records when the primary record supporting fingers are withdrawn. The secondary record supporting arrangement includes a recess formed in the spindle body to provide a record supporting shelf located approximately at the height of the next-to-lowest record in the stack, a pivoted pusher for pushing the next to the lowermost record into an eccentric position in the recess so as to partially overlie the shelf, and a record holder which engages on the eccentric positioned record to hold it on the shelf. An actuator rod is movably mounted within the spindle body for operating the pusher and is also pinned to the record holder to actuate both the record holder and pusher in timed sequence to its operation of the primary record supporting fingers.

The present invention relates to a spindle for record changers. More specifically, the invention relates to a self-supporting spindle of the type having a plurality of primary record supporting fingers which project outwardly through the spindle body to support a stack of records and which are retractable in order to lower or drop the bottom record in the stack to a turntable for playing. The present invention is primarily concerned with record supporting mechanism for supporting the remaining stack of records when the primary supporting fingers are retracted to lower the bottom record.

It is therefore an object of the present invention to provide a record changer spindle having improved mechanism for supporting the remaining stack of records on the upper storage portion of the spindle when the primary record supporting fingers are retracted to lower the bottom record to a turntable.

A further object of the invention is to provide a spindle as last above mentioned wherein the mechanism for supporting the remaining stack of records includes means for positive retention of the lowermost record in the remaining stack.

Another object is to provide record supporting mechanism of the foregoing type which will sense when the last record has been lowered to the turntable.

The foregoing and other objects and advantages of the invention will be apparent from the following description of a preferred embodiment thereof.

Now in order to acquaint those skilled in the art with the manner and utilizing and practicing of our invention, we shall describe in conjunction with the accompanying drawings a preferred embodiment of the invention.

Figure 1:
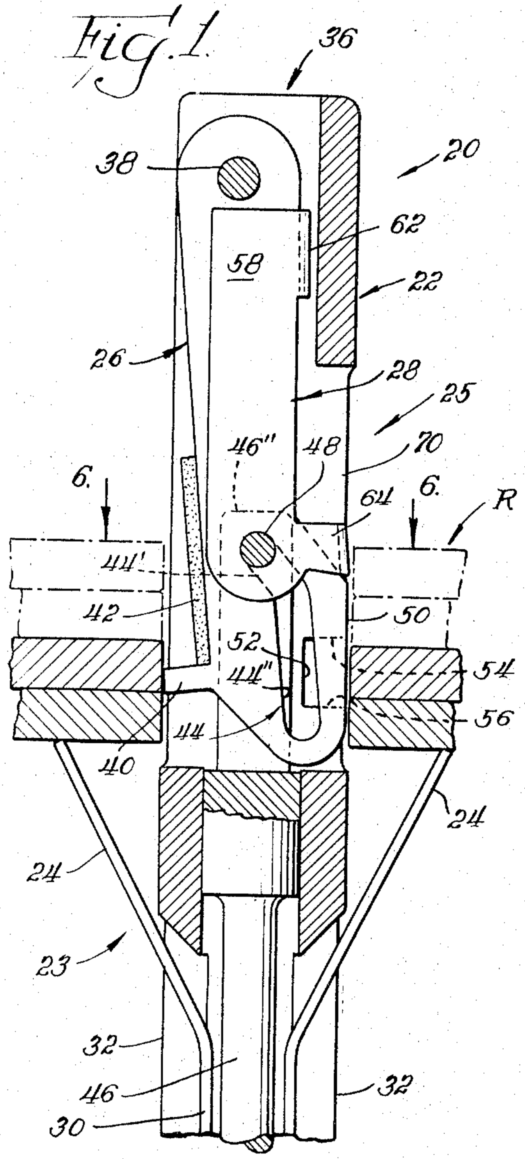
FIGURE 1 is an enlarged fragmentary vertical sectional view showing the upper end of a record changer spindle constructed in accordance with the present invention, the secondary record supporting mechanism for supporting the remainder of the stack being shown in its normal inoperative position as when the entire stack is supported by a plurality of primary record supporting fingers.

Referring now to the drawings, FIGURE 1 shows a record changer spindle 20 having a spindle body 22 which houses primary record supporting means 23 comprising a plurality of record supporting fingers 24, and secondary record supporting means 25 comprising a pusher member 26 and a holding member 28. The record supporting fingers 24 are formed at the upper end of a tubular body member 30 which is vertically movable within the spindle body 22, and the fingers 24 normally project outwardly through corresponding vertical slots 32 formed in the spindle body. As shown in FIGURE 1, a stack of records R mounted over the spindle body 22 is normally supported on the upper ends of the fingers 24. When it is desired to lower a record R to a turntable (not shown) for playing, the secondary supporting means 25 is actuated in a manner to be described later herein to support all but the lowermost record in the stack, and the tube 30 having the fingers 24 is then lowered. When the fingers 24 are brought into engagement with the lower end portions 34 of the slots 32 (see FIGURE 3), the fingers are deflected and thereby retracted into the spindle body 22 so as to release the record thereon to the turntable. The present invention is concerned primarily with the secondary record supporting means 25 which will be described hereinbelow, and it should be understood that the invention may be utilized with various other forms of primary supporting means, the supporting fingers 24 being illustrated merely by way of example.

Figure 7:
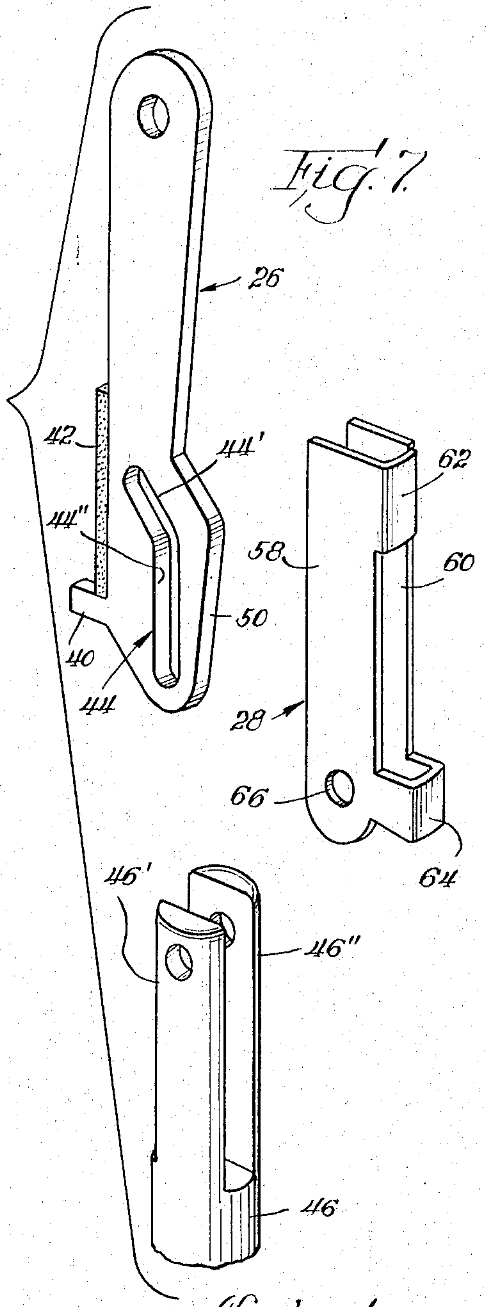
FIGURE 7 is a detail perspective view of three components of the mechanism for supporting the remainder of the record stack on the upper storage portion of the spindle.

Referring to FIGURES 1 and 7, the pusher member 26 is positioned within an opening 36 in the upper end of the spindle body 22 and is pivotally suspended from its upper end therein by a pivot pin 38. The lower end of the member 26 has a short projecting leg 40 extending laterally from one side thereof, and above the leg 40 a rubber pad 42 is secured to the side of the pusher member. A two-directional slot 44 is formed in the lower body of the member 26, and an actuator rod 46 carries at its upper end a pin 48 which projects through the slot 44. The upper end of the actuator rod 46 is bifurcated to form a pair of arms 46' and 46'' in order to accommodate the lower end of the pusher member 26 therebetween, and the rod 46 is vertically movable within the spindle body 22 during a record change cycle in order to actuate the secondary record supporting means 25.

The slot 44 in the pusher member 26 includes an upper inclined portion 44' and a lower generally vertical portion 44''. When the acuator rod 46 is moved downwardly so as to dispose the cross pin 48 in the lower slot portion 44'', the pusher 26 will be pivoted in a clockwise direction as viewed in FIGURE 2 to the extended position there shown wherein the leg 40 projects laterally outwardly of the spindle body 22. When the actuator rod 46 is raised so as to cause the pin 48 to ride in the upper inclined slot portion 44', the pusher member 26 is moved to its retracted position as shown in FIGURE 1 wherein the leg 40 is disposed within the confines of the spindle body 22, and the opposite wall 50 of the pusher member is approximately flush with the outer surface of the spindle body.

Figure 6:
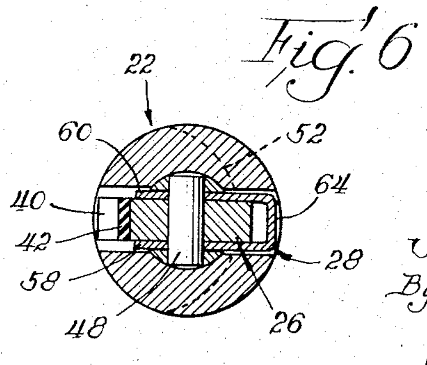
FIGURE 6 is a horizontal sectional view taken substantially along the line 6—6 of FIGURE 1.
Figure 5:
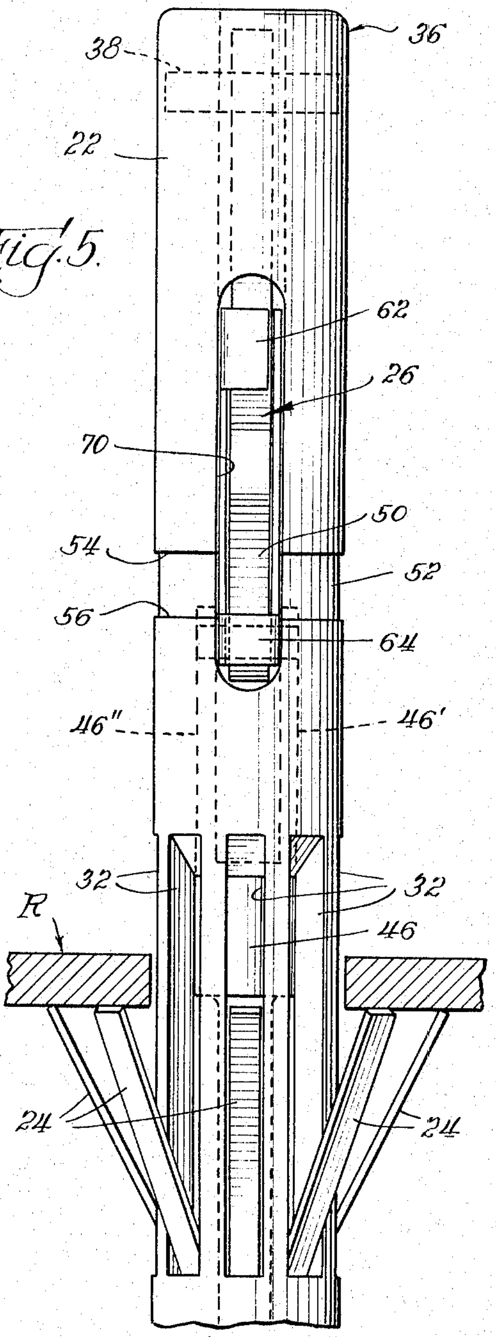
FIGURE 5 is a fragmentary elevational view of the record changer spindle looking approximately in the direction of the arrows 5—5 of FIGURE 4.

The spindle body 22 has a recess 52 formed therein on the side opposite the short projecting leg 40 on the pusher member 26. FIGURE 6 shows that the recess 52 is generally arcuate and extends partially around the spindle body, whereas FIGURES 1, 2 and 5 indicate the upper wall of the recess at 54 and the lower wall at 56. The lower wall 56 of the recess 52 comprises a shelf for supporting a record R on the spindle, and it will be seen that when the pusher member 26 is moved from its retracted position of FIGURE 1 to its extended position of FIGURE 2 the leg 40 will push one of the records R to an eccentric position wherein it is supported on the shelf 56.

Figure 2:
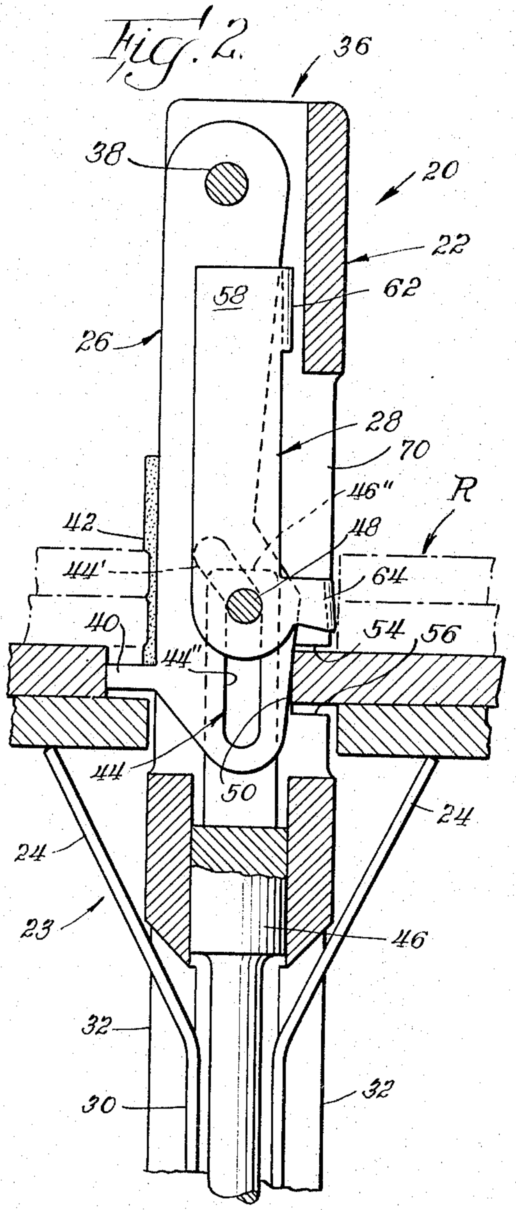
FIGURE 2 is a view similar to FIGURE 1 showing the secondary record supporting mechanism in an operative position after having shifted the next-to-lowermost record of a stack into an offset position wherein the latter is supported on a shelf.
Figure 3:
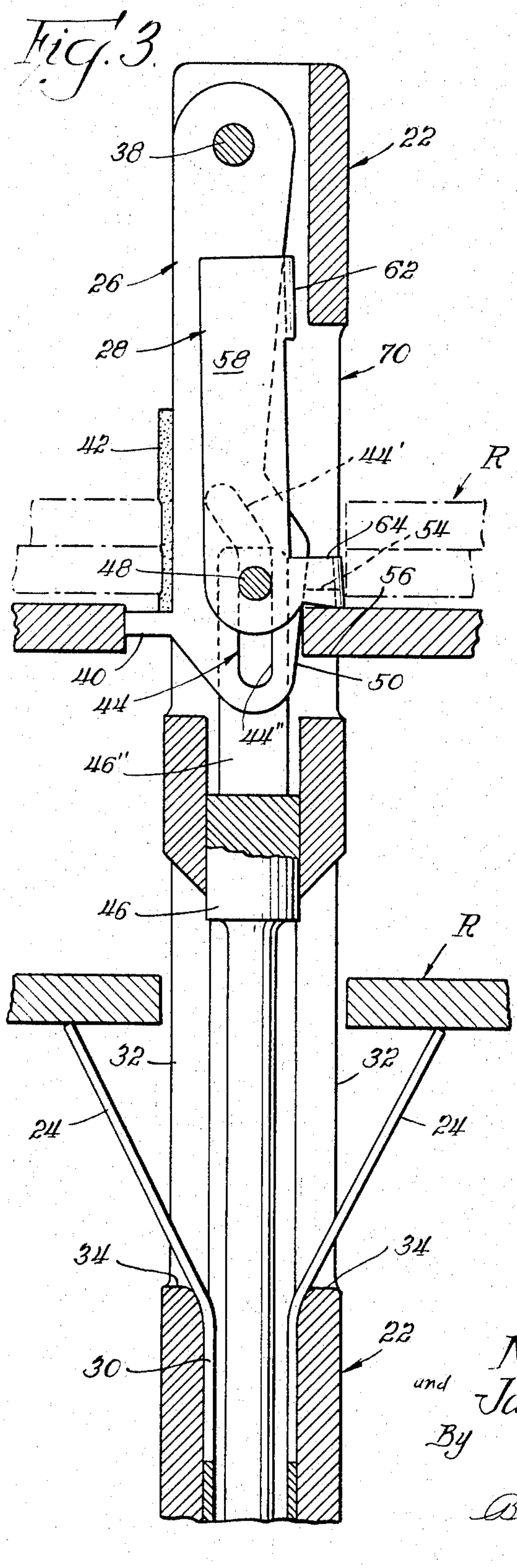
FIGURE 3 is a view similar to FIGURE 2 showing a further stage in the operation of the mechanism for supporting the remainder of the stack and illustrating in particular the manner in which the bottom record of the remaining stack is positively retained while disposed in an offset position on the spindle while the lowermost record is being lowered to a turntable.

The normal operative position of the primary record supporting fingers 24 is as shown in FIGURES 1 and 2, and the stack of records R is normally supported on such fingers. The pusher member 26 is positioned relative to the fingers 24 with the projecting leg 40 spaced above the upper ends of the fingers 24 by a distance which slightly exceeds the thickness of a record R. Accordingly, when the stack of record R is supported on the fingers 24, and the actuator rod 46 is lowered, the pusher 26 will be extended and the projecting leg 40 thereon will push the next-to-lowermost record in the stack to an offset position as shown in FIGURE 2 wherein it will be supported on the shelf 56 as shown in FIGURE 3 when the fingers 24 are moved downwardly in order to lower the bottom record to the turntable.

FIGURE 7 shows the holding member 28 which is bent to form a pair of spaced side walls 58 and 60 interconnected at their upper ends by a stop portion 62 and at their lower ends by a holding portion 64. The walls 58 and 60 are spaced apart an amount which exceeds the thickness of the pusher member 26, since when assembled the pusher members fits between the walls 58 and 60 as shown for example in FIGURE 6. Referring to FIGURE 1, the cross pin 48, which projects through the slot 44 in the pusher member 26, also projects through a pair of aligned apertures 66 formed in the lower ends of the walls 58 and 60. Thus, the holding member 28 moves vertically within the upper end of the spindle body 22 with the actuator rod 46. It can be seen from FIGURE 1 that the holding member 28 partially wraps around the pusher member 26 and that the upper wall portion 62 on the holding member acts as a stop in that it limits the amount by which the upper end of the holding member 28 can move to the left relative to the pusher member 26, while the wall of the spindle body 22 prevents excessive movement of the upper end of the holding member in the opposite direction.

The operation of the holding member 28 is timed with respect to the operation of the pusher member 26 so that promptly after a record R has been pushed to an offset position so as to be supported on the shelf 56, the holding member will move down into engagement with the offset record to firmly grip the same. Thus, when the actuator rod 46 is moved downwardly from its normal position of FIGURE 1, the pusher member 26 is first pivoted on the fixed pin 38 to push the next-to-lowermost record R in the stack to the offset position of FIGURE 2, and as the rod 46 continues downwardly with the pin 48 moving in the lower slot portion 44'', the holding member 28 is moved down to the position of FIGURE 3. In the latter position, the projecting portion 64 on the holding member is engaged against the stop of the offset record proximate the centerhole thereof so as to firmly press the record downwardly against the shelf 56.

In the foregoing manner the next-to-lowermost record in the stack is positively retained on the shelf 56 since the projecting leg 40 on the pusher member prevents the record from returning to a concentric position, and the holding portion 64 on the holding member 28 presses the record firmly down against the supporting shelf. The remainder of the stack above the next-to-lowermost record will of course be supported on the latter while remaining in a concentric position on the spindle, and with the stack thus supported the bottom record is lowered to the turntable by lowering the primary supporting fingers 24 until the latter are retracted into the spindle body 22 as previously described.

Once the bottom record R has been lowered to the turntable for playing, the primary supporting fingers 24 are returned to the position of FIGURE 1, and the actuator rod 46 is again moved upwardly so as to return the members 26 and 28 to the positions of FIGURE 1. Thus, the holding member 28 is first raised to release the bottom record in the remaining stack, and then the pusher member 26 is retracted. It will be understood that when the pusher member 26 is returned to its retracted position, the wall portion 50 thereon will engage the offset bottom record and push it off the shelf 56 and back to a concentric position relative to the spindle body 22, whereby the entire remaining record stack will again be supported on the supporting fingers 24. If it is desired to avoid dropping the stack an amount equal to the thickness of one record, the fingers 24 may first be moved up into engagement with the bottom record of the remaining stack and thereafter lowered to the normal position of FIGURE 1.

It is important to note that when the components are in the normal position of FIGURE 1, the wall portion 50 on the pusher member 26 is approximately flush with the outer wall of the spindle body 22, and because the wall 50 extends the full height of the recess 52, it functions as a guard rail and prevents a record from entering or catching on the recess. Therefore, records can easily be threaded on the spindle body is straight this can be accomplished more readily than on a spindle of the type having an offset upper end portion. Furthermore, if the secondary record suporting components are placed in the position of FIGURE 1 by raising the actuator rod 46, and if the tube 30 is then lowered to retract the primary supporting fingers 24, there is provided a straight spindle which readily permits manual operation, i.e., manual placement of a record over the spindle and down on the turntable.

Figure 4:
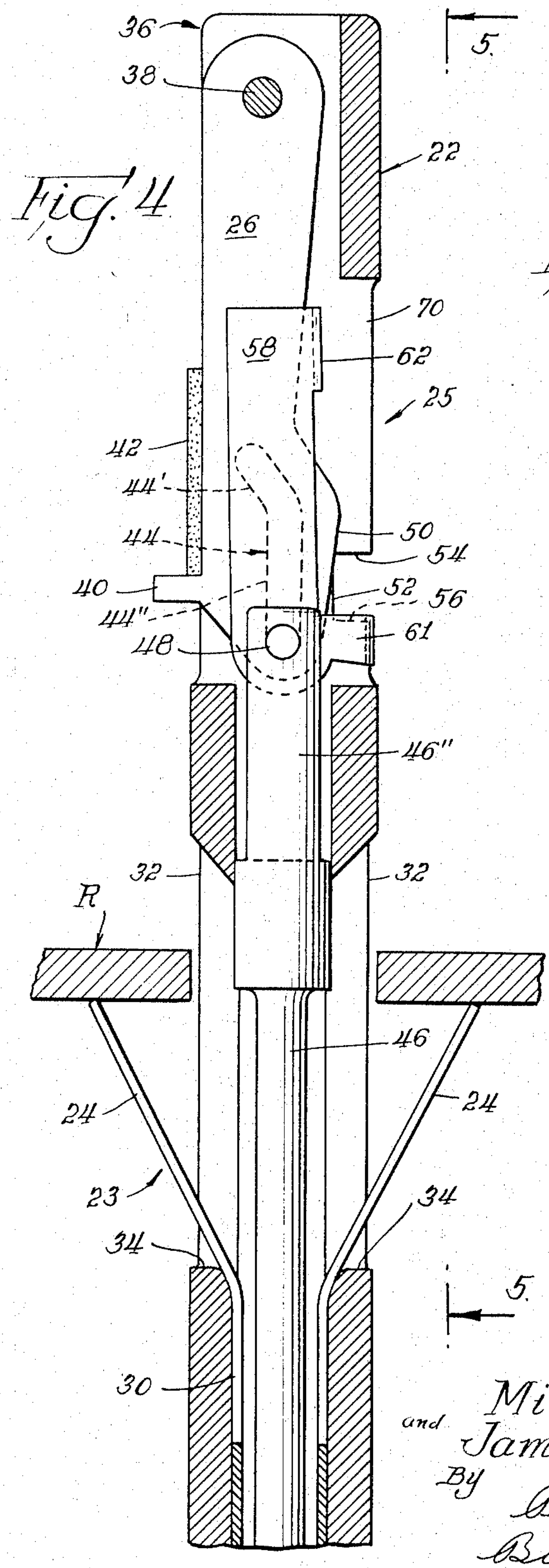
FIGURE 4 is a view similar to FIGURE 3 showing the position of the components when the last record on the spindle is being lowered to the turntable for playing.

FIGURE 3 shows the holding meber 28 in an operative position so as to press a record down on the shelf 56, and thus the actuator rod 46 and holding member 28 will not move below the position shown as long as there is at least one unplayed record disposed on the upper storage portion of the spindle 20. However, it will be understood that when the last record is lowered to the turntable for playing, the holding member 28 will sense the absence of a record on the shelf 56 and will move further downwardly to the position shown in FIGURES 4 and 5 wherein the holding portion 64 moves below the shelf 56 and is disposed adjacent the lower end of a slot 70 formed in the spindle body 22. Such additional downward movement of the actuator rod 46 is sensed in order to condition the record changer for shut-off after the playing of the last record. However, the shut-off mechanism per se is not a part of the present invention and thus is not described herein.

While we have illustrated our invention in a preferred form, we do not intend to be limited to that form, except insofar as the appended claims are so limited, since modifications coming within the scope of our invention will be readily suggested to others with our disclosure before them.

We claim:

1. In a record changer spindle of the type having primary record supporting means which normally supports a stack of records on an upper storage portion of the spindle body and which may be withdrawn to an inoperative position in order to release the lowermost record in the stack to a turntable for playing, the improvement comprising secondary record supporting means for supporting the remaining stack of records on said upper storage portion of the spindle when the primary record supporting means is withdrawn to release the lowermost record, said secondary record supporting means including, in combination, a pair of oppositely disposed vertical extending slots in the upper storage portion of said spindle body, a recess formed in said spindle body to provide record supporting shelf therein, said recess being located above the terminous of one said slots and approximately at the height of the next-to-lowermost record in a stack of records supported on the upper storage portion of said spindle by said primary supporting means, pusher means having two opposed sides mounted within said spindle body and pivotally connected to said spindle body so as to be movable generally transversely of the spindle body, said pusher means having on one side thereof a pushing portion communicable with the other of said slots approximately opposite said recess for engagement at the periphery of the centerhole of said next-to-lowermost record in order to shift said record into an eccentric position with respect to said spendle body and into said recess so as to partially overlie said shelf and having on the opposite side thereof a return portion for pushing an eccentrically positioned record off said shelf and back to a concentric position on said spindle, said return portion having a vertical extent and being so spaced from the pushing portion as to lie substantially flush with the outer surface of the spindle body and occlude the recess when the pushing portion is fully disposed within the spindle body, and actuating means for moving said pusher means in one direction to engage said pushing portion against said next-to-lowermost record prior to release of said record stack by said primary record supporting means and for moving said pusher means in an opposite direction to engage said return portion against an eccentrically positioned record subsequent to the return of said primary record supporting means to an operative supporting position relative to the stack of records remaining on the upper storage portion of said spindle.

2. In a record changer spindle of the type having primary record supporting means which normally supports a stack of records on an upper storage portion of the spindle body and which may be withdrawn to an inorperative position in order to release the lowermost record in the stack to a turntable for playing, the improvement comprising secondary record supporting means for supporting the remaining stack of records on said upper storage portion of the spindle when the primary record supporting means is withdrawn to release the lowermost record, said secondary record supporting means including, in combination, a recess formed in said spindle body to provide a record supporting shelf therein, said recess being located approximately at the height of the next-to-lowermost record in a stack of records suported on the upper storage portion of said spindle by said primary supporting means, said spindle body having a pair of oppositely disposed vertical slots, one of which extends above and below said recess pusher means having two opposed sides of a width approximating the width of said slots and an upper and a lower end, said pusher means being positioned within said spindle body with their two opposite sides aligned with said slots and pivotally suspended therefrom at its upper end, said pusher means having proximate its lower end on one side thereof a pushing portion which projects therefrom and is disposed approximately opposite said recess for engagement through one said slots at the periphery of the centerhole of said next-to-lowermost record in order to shift said record into an eccentric position with respect to said spindle body and carry it into said recess so as to partially overlie said shelf and having proximate its lower end on the opposite side thereof a return portion for pushing an eccentrically positioned record off said shelf and back to a concentric position on said spindle, said return portion having a vertical extent above and below said recess and being spaced from the pushing portion so as to lie substantially flush with the outer surface of the spindle and occlude the recess when the pusher portion is fully received within the spindle body, a cam slot having one portion inclined from vertical and another communicating generally vertical portion formed in said pusher means, and an actuator vertically movable within said spindle body and carrying a pin which projects into said inclined portion of the cam slot in order to pivot said pusher means, said actuator being movable in one direction for pivoting said pusher means to engage said pushing portion against said next-to-lowermost record prior to release of said record stack by said primary record suporting means and said actuator being movable in an opposite direction for pivoting said pusher means to engage said return portion against an eccentrically positioned record subsequent to the return of said primary record supporting means to an operative supporting position relative to the stack of records remaining on the upper storage portion of said spindle.

3. In a record changer spindle of the type having primary record supporting means which normally supports a stack of records on an upper storage portion of the spindle body and which may be withdrawn to an inoperative position in order to release the lowermost record in the stack to a turntable for playing, the improvement comprising secondary record supporting means for supporting the remaining stack of records on said upper storage portion of the spindle when the primary record supporting means is withdrawn to release the lowermost record, said secondary record supporting means including, in combination, a recess formed in said spindle body to provide a record supporting shelf therein, said recess being located approximately at the height of the next-to-lowermost record in a stack of records supported on the upper storage portion of said spindle by said primary supporting means, pusher means having two opposed sides and an upper and a lower end positioned within said spindle body and pivotally suspended therefrom at its upper end, said pusher means having proximate its lower end on one side thereof a pushing portion communicating with an opening in said spindle body and disposed approximately opposite said recess for engagement at the periphery of the centerhole of said next-to-lowermost record in order to shift said record into an eccentric position with respect to said spindle body and into said recess so as to partially overlie said shelf and having proximate its lower end on the opposite side thereof a return portion for pushing an eccentrically positioned record off said shelf and back to a concentric position on said spindle, a holding member mounted within said spindle body and having a holding portion normally disposed above said record supporting shelf, said holding member being movable downwardly toward said self into engagement with an eccentrically positioned record supported on said shelf thereby to hold the same, a cam slot formed in said pusher means, and an actuator vertically moveable within said spindle body and carrying a pin which projects into said cam slot in order to pivot said pusher means and which is also connected with said holding member for moving the latter upwardly and downwardly, said actuator being movable downwardly prior to release of said record stack by said primary record supporting means for pivoting said pusher means in one direction to engage said pushing portion against said next-to-lowermost record and for then moving said holder member downwardly against said record, and said actuator being movable upwardly after return of said primary record supporting means to an operative position to raise said holding member and pivot said pusher means in a direction opposite to said one direction to engage said return portion against an eccentrically positioned record.

4. In a record changer spindle of the type having primary record supporting means which normally supports a stack of records on an upper storage portion of the spindle body and which may be withdrawn to an inoperative position in order to release the lowermost record in the stack to a turntable for playing, the improvement comprising secondary record supporting means for supporting the remaining stack of record on said upper storage portion of the spindle when the primary record supporting means is withdrawn to release the lowermost record, said secondary record supporting means including, in combination, a recess formed in said spindle body to provide a record supporting shelf therein, said recess being located approximately at the height of the next-to-lowermost record in a stack of records supported on the upper storage portion of said spindle by said primary supporting means, moveable pusher means mounted within said spindle body having a pushing portion communicating with an opening in said spindle body and disposed approximately opposite said recess for engagement at the periphery of the centerhole of said next-to-lowermost record in order to shift said record into an eccentric position with respect to said spindle body and into said recess so as to partially overlie said shelf, a holding member mounted within said spindle body and having a holding portion normally disposed above said record supporting shelf, said holding member being movable downwardly toward said shelf into a holding position wherein it is in engagement with an eccentrically positioned record supported on said shelf thereby to hold the same and being movable further downwardly beyond said holding position when the last record on the upper storage portion of the spindle is being lowered to the turntable so as to sense the absence of further records on the storage portion of the spindle, and actuating means for actuating said pusher means and said holding member during a record change cycle, said actuating means being operable prior to release of said record stack by said primary record supporting means.

5. In a record changer spindle of the type having primary record supporting means which normally supports a stack of records on an upper storage portion of the spindle and which may be withdrawn to an inoperative position in order to release the lowermost record in the stack to a turntable for playing, the improvement comprising secondary record supporting means for supporting the remaining stack of records on said upper storage portion of the spindle when the primary record supporting means is withdrawn to release the lowermost record, said secondary record supporting means including, in combination, a recess formed in said spindle to provide a record supporting shelf therein, said recess being located approximately at the height of the next-to-lowermost record in a stack of records supported on the upper storage portion of said spindle by said primary supporting means, laterally movable pusher means disposed within and pivotally conected to said spindle body having a pushing portion disposed approximately opposite said recess for engagement at the periphery of the centerhole of said next-to- lowermost record in order to shift said record into an eccentric position with respect to said spindle and into said recess so as to partially overlie said shelf, vertically movable actuating means for actuating said pusher means during a record change cycle, one of said actuating means and pusher means having a vertically inclined slot and the other having a pin riding in said slot such that the pusher portion of the pusher means is shifted laterally about its pivotal conection to the spindle body with vertical movement of the actuaing means, a holding member mouned within said spindle and having a holding portion normally disposed above said record supporting shelf, said holding member being fastened to said actuating means so as to be movable downwardly therewidth toward said shelf into engagement with an eccentrically positioned record supported on said shelf thereby to hold the same.

6. In a record changer spindle of the type having primary record supporting means which normally supports a stack of records on an upper portion of the spindle body and which may be withdrawn to an inoperative position in order to release the lowermost record in the stack to a turntable for playing, the imporvement comprising secondary record supporting means for supporting the remaining stack of records on said upper storage portion of the spindle when the primary record supporting means is withdrawn to release the lowermost record, said secondary record supporting means including a recess formed in said spindle body to provide a record supporting shelf therein, said recess being located approximately at the height of the next-to-lowermost record in a stack of records supported on the upper storage portion of said spindle body by said primary supporting means, pusher means mounted within said spindle body and having an upper end pivotally suspended thereto so as to be movable generally transversely to the spindle body, said pusher means having a pushing portion provided on one side thereof approximate its lower end which is communicable with an opening in said spindle body disposed approximately opposite said recess for engagement at the periphery of the centerhole of said next-to-lowermost record in order to shift said record into an eccentric position with respect to said spindle body and into said recess so as to partially overlie said shelf, said pusher means having a return portion approximate its lower end on the opposite side thereof for pushing an eccentrically positioned record off said shelf and back to a concentric position on said spindle, said pusher means having an inclined slot formed therein, and vertically movable actuating means carrying a pin which projects into said cam slot in order to rock said pushing means about said pivotal mount to the spindle body in response to vertical movement of the actuating means, a holding member disposed within said spindle body fastened to the actuating means to move vertically therewith, said holding member having a holding portion normally disposed above said record supporting shelf and movable downwardly with the actuating means toward said shelf to engage with an eccentrically positioned record supported on said shelf to hold the same, said actuating means being movable downwardly prior to release of said record stack by said primary record supporting means for pivoting said pusher means to engage said pushing portion against said next-to-lowermost record and for then actuating said holding member downwardly, said actuating means being movable in the opposite direction after return of said primary record supporting means to an operative position so as to raise said holding member and pivot said pusher means opposite to said one direction to engage said return portion against an eccentrically positioned record.

References Cited

UNITED STATES PATENTS 3,288,471 11/1966 Weedfall ------------ 274—10

FOREIGN PATENTS 127,629 3/1950 Sweden.
1,034,383 7/1958 Germany.
1,056,385 4/1959 Germany.

LEONARD FORMAN, *Primary Examiner.*

J. M. FREED, *Assistant Examiner.*